United States Patent
Khan et al.

(10) Patent No.: US 11,413,795 B1
(45) Date of Patent: Aug. 16, 2022

(54) METHOD OF MAKING COMPOSITE FROM GREEN MATERIAL

(71) Applicant: King Abdulaziz University, Jeddah (SA)

(72) Inventors: Anish Khan, Jeddah (SA); Abdullah Mohamed Asiri, Jeddah (SA); Sanjay Mavinkere Rangappa, Bangkok (TH)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/400,646

(22) Filed: Aug. 12, 2021

(51) Int. Cl.
*B29C 43/00* (2006.01)
*B29C 70/02* (2006.01)
(Continued)

(52) U.S. Cl.
CPC .......... *B29C 43/006* (2013.01); *B29C 43/003* (2013.01); *B29C 43/146* (2013.01); *B29C 70/025* (2013.01); *D01C 1/02* (2013.01); *D01C 3/00* (2013.01); *D01F 4/00* (2013.01); *B29K 2105/122* (2013.01)

(58) Field of Classification Search
CPC .... D01F 4/00; B29K 2105/122; D01D 1/065; D21D 1/20; D21D 1/00; D21D 1/004; D01C 1/02; D21C 3/02; B29C 43/146
See application file for complete search history.

(56) References Cited

U.S. PATENT DOCUMENTS

| | | | | |
|---|---|---|---|---|
| 2,398,347 A | * | 4/1946 | Anderson | C04B 28/02 507/104 |
| 2,814,851 A | * | 12/1957 | Hervey | B29C 48/832 530/357 |

(Continued)

FOREIGN PATENT DOCUMENTS

| | | |
|---|---|---|
| BR | 102013003950-0 B1 | 9/2020 |
| CN | 104233505 A | 12/2014 |
| IN | 201941027362 A | 8/2019 |

OTHER PUBLICATIONS

Kumar et al., Physicochemical and Thermal Properties of Ceiba pentandra Bark Fiber, Oct. 3, 2017, Taylor & Francis (Year: 2017).*

(Continued)

*Primary Examiner* — Francisco W Tschen
*Assistant Examiner* — Elisa H Vera
(74) *Attorney, Agent, or Firm* — Oblon, McClelland, Maier & Neustadt, L.L.P.

(57) ABSTRACT

A method of making a composite laminate includes dequilling chicken feathers to form chicken feather fibers (CFFs). The CFFs and Ceiba Pentandra bark fibers (CPFs) are milled to form milled CFFs and milled CPFs so that the milled CFFs have a length of smaller than 200 microns and the milled CPFs have a length of smaller than 600 microns. The CFFs are treated with an amine compatibilizer to esterify carboxy groups present on keratin in the CFFs. A mixture of an epoxy resin, the milled CFFs, and the milled CPFs is solution cast to form an epoxy composite. A first carbon fabric layer and a second carbon fabric layer are placed on a front side and a backside, respectively, of the epoxy composite to form an epoxy laminate precursor. The epoxy laminate precursor is compression molded to cure the epoxy laminate precursor to form the composite laminate.

13 Claims, 10 Drawing Sheets

(51) Int. Cl.
*D01F 4/00* (2006.01)
*D01C 1/02* (2006.01)
*D01C 3/00* (2006.01)
*B29C 43/14* (2006.01)
*B29K 105/12* (2006.01)

(56) References Cited

U.S. PATENT DOCUMENTS

| | | | | |
|---|---|---|---|---|
| 5,817,303 | A * | 10/1998 | Stedronsky | A61L 24/108<br>424/78.02 |
| 5,897,739 | A * | 4/1999 | Forster | B29C 70/543<br>156/285 |
| 5,958,593 | A * | 9/1999 | Shomer | C08G 59/68<br>428/413 |
| 2007/0077423 | A1* | 4/2007 | Yan | D02G 3/042<br>428/373 |
| 2008/0236716 | A1* | 10/2008 | Bergman | C08L 89/04<br>152/517 |
| 2010/0078287 | A1* | 4/2010 | Gaffney | F16D 69/026<br>192/107 M |
| 2011/0271616 | A1* | 11/2011 | Rasmussen | B32B 21/14<br>52/220.1 |
| 2011/0272856 | A1 | 11/2011 | Rasmussen et al. | |
| 2011/0293876 | A1 | 12/2011 | Rasmussen et al. | |
| 2018/0334522 | A1* | 11/2018 | Rabnawaz | C08G 64/34 |
| 2020/0181845 | A1* | 6/2020 | Dinzinger | D21H 19/385 |
| 2021/0257228 | A1* | 8/2021 | Sakai | B32B 27/30 |
| 2021/0260793 | A1* | 8/2021 | Iftime | B29B 17/0036 |
| 2021/0323253 | A1* | 10/2021 | Lu | B29C 70/12 |

OTHER PUBLICATIONS

Performance Composites, Carbon Fiber Composite Design Guide, Feb. 9, 2018, Performance Composites (Year: 2018).*

Dipen Kumar Rajak, et al., "Fiber-Reinforced Polymer Composites: Manufacturing, Properties, and Applications", Polymers, vol. 11, Issue 10: 1667, Oct. 12, 2019, pp. 1-37.

Akarsh Verma, et al., "Experimental Analysis on Carbon Residuum Transformed Epoxy Resin: Chicken Feather Fiber Hybrid Composite", Polymer Composites, vol. 40, Issue 7, Oct. 12, 2018, pp. 2690-2699 (Abstract only).

A. Verma, et al., "Physical and Thermal Characterization of Chicken Feather Fiber and Crumb Rubber Reformed Epoxy Resin Hybrid Composite", Advances in Civil Engineering Materials, vol. 7, No. 1, 2018, pp. 2690-2699 (Abstract only).

* cited by examiner

METHOD OF MAKING COMPOSITE FROM GREEN MATERIAL

STATEMENT OF ACKNOWLEDGEMENT

The inventors extend their appreciation to the Deputyship for Research and Innovation, Ministry of Education in Saudi Arabia for funding this research work through the project number 2020-069 and King Abdulaziz University, DSR, Jeddah, Saudi Arabia.

BACKGROUND

Technical Field

The present disclosure is directed to a method of making a composite laminate, and, more particularly, a method of making a composite laminate using chicken feather fibers and Ceiba Pentandra bark fibers.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Composite materials are of great importance for engineering applications due to their unique advantages of having high strength to weight ratio, non-corrosive property, and high fracture toughness. For example, a composite material can include reinforcing fiber fillers, carbon, glass, aramid, boron fiber, and a low-strength polymeric matrix. Although such materials provide good physical and mechanical properties, the composite material is non-renewable and non-recyclable, requires high energy consumption in the manufacturing process, poses a health risk, and is non-biodegradable. Meanwhile, environmental footprints of these fibers have become a great concern for several industries and society at large. This has led to the usage of natural fibers as reinforcement in composite materials.

Further, the vast amount of bird feathers produced by various poultry-based industries as waste is a significant solid agricultural disposal problem. The disposal of waste in an economically and environmentally acceptable manner is a critical problem faced by many modern industries. This is mainly due to the increased difficulties in locating disposal facilities and complying with stringent environmental quality requirements imposed by waste management and disposal legislation. Globally, the poultry-processing industry generates large quantities of feather by-products. There lies a great opportunity to effectively use bird feather fibers to manufacture composite materials.

BR102013003950B1 discloses a resin containing a duroplastica (e.g., an epoxy resin) and a fibrous material (e.g., carbon fibers, CPFs). However, a stabilizing agent (e.g., copolyester) is required to create the resin.

IN201941027362A discloses polymer nanocomposites reinforced by chicken nano keratin fiber, but the polymer includes Al—SiC nanoparticles and is fabricated using an ultrasonicator-assisted wet layup method.

Each of the aforementioned disclosures suffers from one or more drawbacks hindering adoption. Accordingly, it is one object of the present disclosure to provide a method of making a composite laminate in a cost-effective and efficient manner using the natural fibers without losing the physical and mechanical properties.

SUMMARY

In an exemplary embodiment of the present disclosure, a method of preparing a composite laminate is disclosed. The method includes dequilling chicken feathers to form chicken feather fibers (CFFs). The CFFs and Ceiba Pentandra bark fibers (CPFs) are milled to form milled CFFs and milled CPFs so that the milled CFFs have a length of smaller than 200 microns and the milled CPFs have a length of smaller than 600 microns. In some embodiments, the CFFs and the CPFs may be co-milled to form a macroscopically homogeneous mixture of the milled CFFs and the milled CPFs. The CFFs are treated with an amine compatibilizer to esterify carboxy groups present on keratin in the CFFs. The method further includes solution casting a mixture of an epoxy resin, the milled CFFs, and the milled CPFs to form an epoxy composite. In some embodiments, the method includes mixing the epoxy resin, the milled CFFs, and the milled CPFs at an elevated temperature to form an epoxy mixture, casting the epoxy mixture onto a casting mold, and drying to form the epoxy composite. The epoxy composite may have a thickness of 2-4 millimeters.

The method further includes placing a first carbon fabric layer on a front side of the epoxy composite and a second carbon fabric layer on a backside of the epoxy composite to form an epoxy laminate precursor and compression molding the epoxy laminate precursor in a mold to cure the epoxy laminate precursor to form the composite laminate. Compression molding includes preheating a mold cavity to contain an object requiring a desired shape. The composite laminate may have a thickness of 2-4 millimeters. The method includes curing the composite laminate at an elevated temperature. In some embodiments, the method includes curing the composite laminate at 80° C. for 24 hours to form a cured composite laminate before cutting the cured composite laminate into required specimen dimensions.

In some embodiments, the compression molding of the epoxy laminate precursor includes distributing the first carbon fabric layer and the second carbon fabric layer by using brushes and hand lay-up. The compression molding further includes placing a first thin film below the epoxy laminate precursor to cover a bottom mold and placing a second thin film over the epoxy laminate precursor, wherein the second thin film is covered by a top mold.

In some embodiments, the method further includes extracting the CFFs from chicken feathers by washing the chicken feathers with an organic solvent that is soluble in water and milling the CFFs having a length of 10-30 mm to form the milled CFFs. In some embodiments, the milled CFFs may have a density of 0.35-0.40 gram per cubic centimeter. The method also includes extracting the CPFs from Ceiba Pentandra bark by immersing the Ceiba Pentandra bark in water, comminuting the Ceiba Pentandra bark to form comminuted CPFs, treating the comminuted CPFs with an aqueous solution of sodium hydroxide to form the CPFs, and milling the CPFs to form the milled CPFs. The milled CPFs may have a density of 0.55-0.60 grams per cubic centimeter.

In some embodiment, the method may include mixing the epoxy resin with a hardener. The hardener may include a mixture of isophorone diamine and benzyl alcohol and the epoxy resin and the hardener are mixed in a weight ratio of 1:0.5 to 1:0.2. The isophorone diamine may have a weight percentage of less than 60% in the hardener, and the benzyl alcohol may have a weight percentage of less than 40% in the hardener.

In some embodiments, the epoxy resin may have a weight fraction of 50%-75% in the composite laminate, the CFFs may have a weight fraction of 10%-30% in the composite laminate, the CPFs may have a weight fraction of 10%-30% in the composite laminate, and the first carbon fabric layer and the second carbon fabric layer may have a weight fraction of 5%-15% in the composite laminate. In some exemplary embodiments, more than 50% of the chemical composition of the epoxy resin is from plants. In some embodiments, the first carbon fabric layer and the second carbon fabric layer may include carbon fabrics in a plain woven form of 300-400 grams per square meter.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
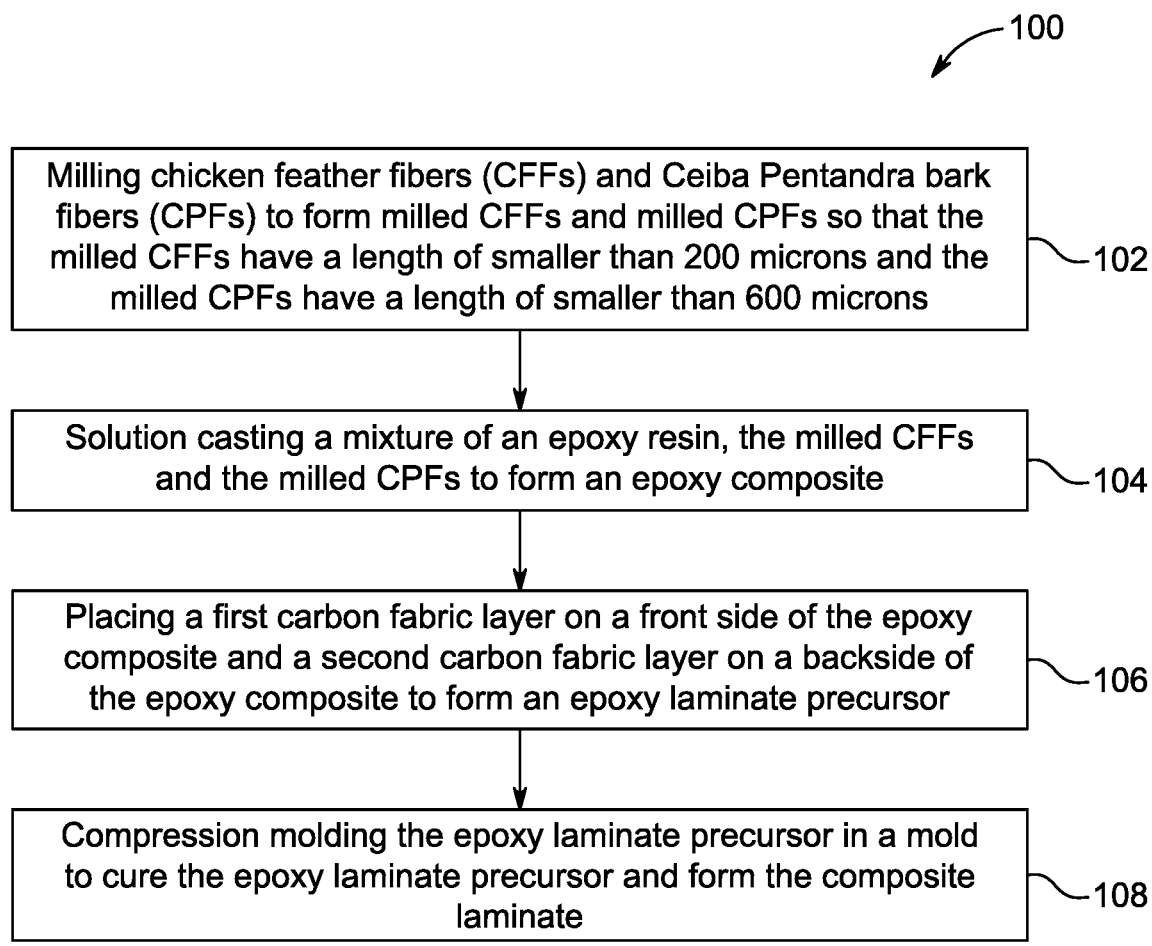
FIG. 1 is a schematic flow diagram of a method of preparing a composite laminate, according to certain embodiments of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure relate to a method of preparing a composite laminate. The composite laminate uses natural fibers such as chicken feather fiber and Ceiba Pentandra bark fiber as a reinforcement with carbon fabric layers for engineering applications.

FIG. 1 illustrates a method 100 of preparing a composite laminate, according to an embodiment of the present disclosure. At step 102, the method 100 includes milling chicken feather fibers (CFFs) and Ceiba Pentandra bark fibers (CPFs) to form milled CFFs and milled CPFs so that the milled CFFs have a length of smaller than 200 microns, preferably 50-150 microns, preferably 75-125 microns, preferably about 100 microns, and the milled CPFs have a length of smaller than 600 microns, preferably 400-600 microns, preferably 450-550 microns, preferably 475-525 microns, preferably about 500 microns,. In an embodiment, the method 100 includes extracting the CFFs from chicken feathers by washing chicken feathers with an organic solvent that is soluble in water. In some embodiments, the chicken feathers may include feathers collected from different parts of the chicken such as fluff, down, wing, and tail feathers.

In some embodiments, the chicken feathers may be collected from poultry farms and local chicken meat vendors where the chicken feathers are considered as a waste product and are discarded. In one embodiment, the organic solution may be ethanol. In another embodiment, the chicken feathers may be dried in an oven after washing the chicken feathers with the organic solvent. Further, CFFs having a length of 10-30 mm, preferably 15-25 mm, preferably 17-22 mm, preferably about 20 nm, are milled to form the milled CFFs. The chicken feathers having the length of 10-30 mm were separated from the quill using a separator. In some embodiments, the separators may use turbulent flow to separate the quills from the feathers. In one embodiment, the milled CFFs have a density of 0.35-0.40 grams per cubic centimeter.

In one embodiment, the method 100 includes extracting the CPFs from Ceiba Pentandra bark by immersing the Ceiba Pentandra bark in water. In some embodiment, the Ceiba Pentandra bark may be immersed in water for a period of 10-15 days to dissolve the unwanted substance surrounding the Ceiba Pentandra bark by the action of moisture or bacteria. The method 100 further includes comminuting the Ceiba Pentandra bark to form comminuted CPFs. The comminuting may be performed by processes such as, but not limited to, crushing, grinding, cutting, etc. The CFFs may be primary CFFs including contour, bristle, semi-plume, down or filo plume or a combination thereof. In some embodiments, the CPFs may be extracted from other parts of Ceiba Pendtandra including bark. Such parts may include fruit clusters, flowers, buds, twigs, roots, leaves of a combination thereof.

In one embodiment, the method 100 also includes treating the comminuted CPFs with an aqueous solution of sodium hydroxide to form the CPFs and treating the comminuted CPFs with a 1-10%, preferably 3-7% (w/v) aqueous solution of sodium hydroxide at an ambient temperature for 30 minutes. In one embodiment, the aqueous solution may have about 3% (w/v) of sodium hydroxide. In another embodiment, the aqueous solution may have about 5% (w/v) of sodium hydroxide. In yet another embodiment, the aqueous solution may have about 7% (w/v) of sodium hydroxide. The comminuted CPFs may further be neutralized, cleaned, and dried. The method 100 may further include milling the CPFs to form the milled CPFs. In an embodiment, the milled CPFs have a density of 0.55-0.60 grams per cubic centimeter. In an embodiment, the CFFs and the CPFs may be co-milled to form a macroscopically homogeneous mixture of the milled CFFs and the milled CPFs. In another embodiment, the milling may be performed by machines such as, but not limited to, Pulverisette19®, ball mill, hammer mill, and cutting mill.

In some embodiments, the CFFs include 70-95 wt. % of crude protein, for example 90 wt. % of keratin, while the CPFs include holocellulose as a majority component, e.g., preferably more than 60% wt, more than 70 wt %, more than 80 wt % based on the weight of the CPFs. Keratin has amide groups, carboxylic groups, and disulfide groups with hydrogen bonding and disulfide bridges connecting keratin molecules. Similarly, holocellulose has hydroxyl groups and thus also may also engage in hydrogen bonding. In one embodiment, a compatibilizer is added to a blend of the CFFs and the CPFs before being co-milled. The compatibilizer may form hydrogen bonding with both keratin and holocellulose in order to increase compatibility between the CFFs and the CPFs. The compatibilizer may act as a linking agent to bond CFFs and CPFs. The hydrogen bonding may also function as weak crosslinking points. The compatibilizer can include ethylene diamine, ethylenediaminetetraacetic acid (EDTA), tris(hydroxymethyl)aminomethane, or other chelating agents. The compatibilizer can also include a block or graft copolymer of keratin and cellulose, or the like. In another embodiment, the CFFs and the CPFs may be crosslinked before being co-milled. In one example, a cross-linking agent may be used to crosslink keratin and holocellulose. In another example, the CFFs and/or the CPFs may be chemically modified. For instance, the CPFs can be treated with $NaIO_4$ to impart dialdehyde groups to holocellulose. The dialdehyde groups can react with the -NH groups of keratin so that holocellulose is linked to keratin via covalent bonding [ACS *Sustainable Chem. Eng.* 2017, 5, 7, 5669-5678, incorporated herein by reference in its entirety]. An amount of $NaIO_4$ relative to the CPFs can be varied to adjust a linking density between keratin and holocellulose.

Alternatively, a silane agent can readily react with hydroxyl groups of holocellulose and graft functional groups to holocellulose.

The chicken fibers are preferably dried prior to pretreatment and/or compatibilization. In their normal natural state chicken fiber feathers may have a moisture content of around 10 wt. %. After milling, the milled CFFs are preferably dried by heating under reduced pressure. Heating is typically carried out at temperatures of 30-80° C., preferably 40-70° C. or from about 50 to about 60° C. Heating is carried out for a time and under pressure sufficient to reduce moisture content of the milled CFFs to less than 5% by weight, preferably less than 4%, less than 2% or about 1% by weight. Further drying of CFFs risks subjecting the keratin structure to denaturization. Milling and drying preferably do not cause denaturization in the form of breakage of the disulfide bonds in an amount more than 20% based on the total number of disulfide bonds in a given weight. Preferably no more than 15%, 10% and most preferably no more than 5% of disulfide bonds are broken during drying and milling. Prior to milling, chicken feathers are subject to dequilling such that the resultant milled CFFs do not contain more than 5 wt % weight of water.

During compatibilization it is likewise advantageous to maintain disulfide bonds to the greatest extent possible. In a preferred embodiment carboxyl groups of amino acid residues forming keratin are esterified with an alcohol under slightly acidic conditions. In order to improve compatibilization an epoxy matrix, CFFs are esterified with a long chain aliphatic alcohol such as a C5-C12 unbranched alcohol, or preferably C8-C10 a branched alcohol. In other aspects the long-chain alcohol includes at least six carbon atoms in a linear chain with 2-4 C1 or C2 branches.

At step 104, the method 100 includes solution casting a mixture of an epoxy resin, the milled CFFs, and the milled CPFs to form an epoxy composite. Solution casting is a method to produce substrates having a matrix and a fiber reinforcement, the matrix holds the fiber reinforcement together. In an embodiment, the epoxy resin may have more than 50% of the chemical composition from plants. In another embodiment, the epoxy resin may have more than 75% of the chemical composition from plants. In yet another embodiment, the epoxy resin may have more than 90% of the chemical composition from plants. In some embodiments, the epoxy resin may be selected from a group of bio epoxy resins such as, but not limited to, SR GreenPoxy 56®, furan-based epoxy resins.

The method 100 may include mixing the epoxy resin with a hardener in a weight ratio of 1:0.5 to 1:0.2, preferably 1:0.4 to 1:0.3, preferably 1:0.35. The hardener may include a mixture of isophorone diamine and benzyl alcohol.

In one embodiment, the isophorone diamine may have a weight percentage of less than 60%, preferably 30-60%, preferably 40-50%, preferably about 45%, in the hardener and the benzyl alcohol may have a weight percentage of less than 40%, preferably 10-40%, preferably 20-30%, preferably about 25% in the hardener. In another embodiment, the isophorone diamine may have a weight percentage of less than 40% in the hardener and the benzyl alcohol may have a weight percentage of less than 30% in the hardener. In yet another embodiment, the isophorone diamine may have a weight percentage of less than 20% in the hardener and the benzyl alcohol may have a weight percentage of less than 10% in the hardener. In some embodiments, the hardener may be SD Surf Clear®.

In one embodiment, the hardener may be mixed with the milled CFFs before being mixed with the epoxy resin.

Consequently, the epoxy resin can harden around the milled CFFs and have better affinity to the milled CFFs. CFFs on which the hardener is adsorbed permit the epoxy resin to be formulated with hardener. This in turn leads to longer resin life and more flexibility with cure time and green time. Individual milled CFFs may also be confined by a cross-linked network of the epoxy resin after the hardening. Similarly, the hardener may be mixed with the milled CPFs, or the hardener may be mixed with both the milled CFFs and the mixed CPFs, before being mixed with the epoxy resin.

In one embodiment, the disulfide bridges in keratin are reduced to mercapto groups, which can react readily with epoxide groups in the resin. Therefore, the CFFs with mercapto groups may be used alone or with another hardener to harden the epoxy resin. In another embodiment, a hardening moiety (e.g. amine, imidazole, anhydride, thiol, etc.) may be grafted to keratin and/or holocellulose. The keratin and/or holocellulose having the hardening moiety may be used alone or with another hardener to harden the epoxy resin. The keratin and/or holocellulose is then covalently bonded to an epoxy matrix after the hardening.

In an embodiment, an epoxy mixture may be formed by mixing the epoxy resin, the milled CFFs, and the milled CPFs at an elevated temperature preferably 40-80° C., preferably 50-70° C., preferably 60° C. Further, the method 100 may include casting the epoxy mixture onto a casting mold and drying to form the epoxy composite. Casting is an act of pouring liquid into a cavity of a mold having a desired shape to form an object. The epoxy composite may have a thickness of 2-4 mm, preferably 2.5-3.5 mm. In one embodiment, the epoxy composite may have a thickness of about 2.8 millimeters.

At step 106, the method 100 includes placing a first carbon fabric layer on a front side of the epoxy composite and a second carbon fabric layer on a backside of the epoxy composite to form an epoxy laminate precursor. The addition of the first carbon fabric layer and the second carbon fabric layer improves the mechanical and thermal properties of the epoxy composite. In an embodiment, the first carbon fabric layer and the second carbon fabric layer may include carbon fabrics in a plain woven form of 300-400 grams, preferably 360 grams, per square meter. Further, the method 100 may include distributing the first carbon fabric layer and the second carbon fabric layer by using brushes and hand lay-up.

At step 108, the method 100 includes compression molding the epoxy laminate precursor in a mold to cure the epoxy laminate precursor and form the composite laminate. The composite laminate may have a thickness of 2-4 mm, preferably 2.5-3.5 mm, preferably 3.0 mm. In one embodiment, the composite laminate may have a thickness of about 2.6 millimeters. In another embodiment, the composite laminate may have a thickness of about 3.0 millimeters. In yet another embodiment, the composite laminate may have a thickness of about 3.4 millimeters. The mold may include a top mold and a bottom mold to contain the epoxy laminate precursor. In one embodiment, a first thin film may be placed below the epoxy laminate precursor to cover a bottom mold. In another embodiment, a second thin film may be placed over the epoxy laminate precursor and the second thin film is covered by the top mold. In some embodiments, the bottom and top molds are made of hydrophobic materials and provide support to the second thin film. In some examples, the molds are made up of hard materials such as Teflon, or copper to provide the support and protection to the film. In some embodiments, the molds are coated with nanostructure coatings to enhance the toughness and provide safety to the thin film.

The first thin film and the second thin film cover the epoxy laminate precursor to protect the epoxy laminate precursor from any damage caused during the compression molding process. Further, the first thin film and the second thin film may be hydrophobic and non-reactive with the epoxy laminate precursor to protect the epoxy laminate precursor from contamination. In some embodiments, the first laminate and the second laminate may be manufactured using polymers, for example, but not limited to, Chemfilm® Mr, polytetrafluoroethylene (PTFE), ethylene tetrafluoroethylene (ETFE), ethylene chlorotrifluoroethylene (ECTFE), or combinations thereof. The method 100 may further include curing the composite laminate at an elevated temperature, preferably 60-100° C., preferably 70-90° C. In one embodiment, the method 100 may include curing the composite laminate at 80° C. for 24 hours to form a cured composite laminate. The curing may be done by using ovens such as, but not limited to, Universal oven XU058®, composite curing ovens, industrial curing ovens. The composite laminate may further be cut into required specimen dimensions for engineering applications.

In an exemplary embodiment, the epoxy resin may have a weight fraction of 50%-75%, preferably 55-70%, preferably 60-65% in the composite laminate; the CFFs may have a weight fraction of 10%-30%, preferably 15-25%, preferably 17-23%, in the composite laminate; the CPFs may have a weight fraction of 10%-30%, preferably 15-25%, preferably 17-23%; in the composite laminate; and the first carbon fabric layer and the second carbon fabric layer may have a weight fraction of 5%-15%, preferably 7-13%, preferably about 10%, in the composite laminate. In some exemplary embodiments, more than 50%, preferably 60-90%, preferably 70-80%, preferably 75%, of the chemical composition of the epoxy resin is from plants. In some examples, the epoxy resin may be derived from plant-derived phenolic acid such as difunctional phenolic acids. In some embodiments, the plant-based epoxy resins are nontoxic and renewable with high modulus, high glass transition temperature and high elongation at break. In some embodiments, the first carbon fabric layer and the second carbon fabric layer may include carbon fabrics in a plain-woven form of 300-400 grams, preferably 360 grams, per square meter. Thus, the method 100 of preparing the composite laminate is low cost and eco-friendly method. The CPFs and CFFs serve as reinforcement for the composite laminate making it a low-cost and low-density bio composite further by increasing its recyclability and biodegradability.

The composite formed by the method 100 may have application in various fields such as, but not limited to, electric devices, aerospace industry, helmets, interiors of automobiles, etc.

EXAMPLES

Manufacturing of Composites and Preparation of Specimens

For manufacturing the composites of the present disclosure, two types of compositions were prepared, a first composition containing CPFs filler reinforced with carbon fabrics layers to form a bio epoxy composite, alternatively referred to as "CPCEFC" and a second composition containing a mixture of CPFs and CFFs as fillers reinforced with carbon fabric layers to form another bio epoxy composite, alternatively referred to as "CPCFCEFC". For each test, five identical samples of the CPCEFC and the CPCFCEFC specimens were analyzed to obtain an average value.

The CFFs and the CPFs fillers are reinforced with the epoxy resins to form the composite laminate by solution-casting technique as per weight fraction presented in Table 1. The fillers were subsequently mixed with the epoxy resin under constant stirring on a magnetic stirrer-hotplate at 60° C. for 30 min. After proper stirring, the composite laminate was obtained by pouring the solution onto a casting mold as a casting surface and allowing the solution to evaporate at room temperature overnight. The composite laminate had an area of 200 mm×200 mm and a thickness of 2.8 mm.

TABLE 1

| Composites | Weight (g) | | | | Weight fraction (%) | | | | Volume fraction (%) |
| --- | --- | --- | --- | --- | --- | --- | --- | --- | --- |
| | wf | | | | Wf | | | | |
| | wCFF | wCPF | wC | wm | WCFF | WCPF | WC | Wm | |
| CPCEFC | — | 100 | 25 | 150 ± 5 | — | 36.36 | 9.09 | 54.54 | 60 |
| CPCFCEFC | 50 | 50 | 25 | 150 ± 5 | 18.18 | 18.18 | 9.09 | 54.54 | 65 |

CPCEFC: Ceiba pentandra bark fiber filler reinforced carbon fabrics layered bioepoxy composites. CPCFCEFC: Ceiba pentandra bark fiber/chicken feather fiber fillers reinforced carbon fabrics layered bioepoxy composites. CFF: Chicken feather fiber. CPF: Ceiba Pentandra bark fiber. C: Carbon fabric. m: Matrix.

After the casting technique, the composite laminate was prepared by the compression molding technique. In this process, the prepared composite laminate from the casting technique was placed on the bottom mold cleaned by wax, and covered with thin film. Then the epoxy resin was applied after placing carbon fabrics as skin layers (top and bottom layers) on the composite laminate, which was equally distributed by using brushes, followed by hand lay-up. Later, the thin films were placed over the composite laminate. After this, the laminate was covered by top mold, then cured at room temperature for 24 h. The composite laminate (Final Dimension: 200 mm×200 mm×3 mm) was then taken off the mold and post-cured in Universal Oven (Make & Model: FRANCE ETUVES, XU058) at 80° C. for 24 h before cutting into required specimen dimensions.

The prepared composite laminate was taken out from the Universal Oven and then specimens of suitable dimensions were prepared from composites for testing in accordance with ASTM standards by using a diamond-tipped saw cutter. Emery sheets were used to remove the rough edges of test specimens. Five identical test specimens were prepared for different tests.

Testing and Characterization

To determine voids in composites, ASTM D2734-94 method was used. The tensile test was carried out using a Universal testing machine (UTM) (Model: Comtech tensile testing machine M1 type) with a load cell of 1 kN. The dimension, gauge length, and cross-head speed were chosen according to the ASTM D3039. The test was carried out at a room temperature of 25° C and a loading rate of 2.5 mm/min. Flexural test was conducted according to the ASTM D790-07 on the same UTM using a flexural test fixture and a load cell of 1 KN. Impact strength of the composites was measured by the pendulum impact tester (Model: Zwick/Roell, 727676) as per ASTM D256-06 standard. Micro-hardness of the composite laminate specimens was measured by using a Shore hardness tester (Model: Rex durometer, OS-1) as per ASTM E384 standard. Thermogravimetric analysis (TGA) traces were recorded in the temperature range from 50 to 700° C. with a heating rate of 10° C./min by a TGA 2 (Model: Mettler Toledo TGA/DSC 3+HT/1600, Switzerland).

Results

Figure 2:
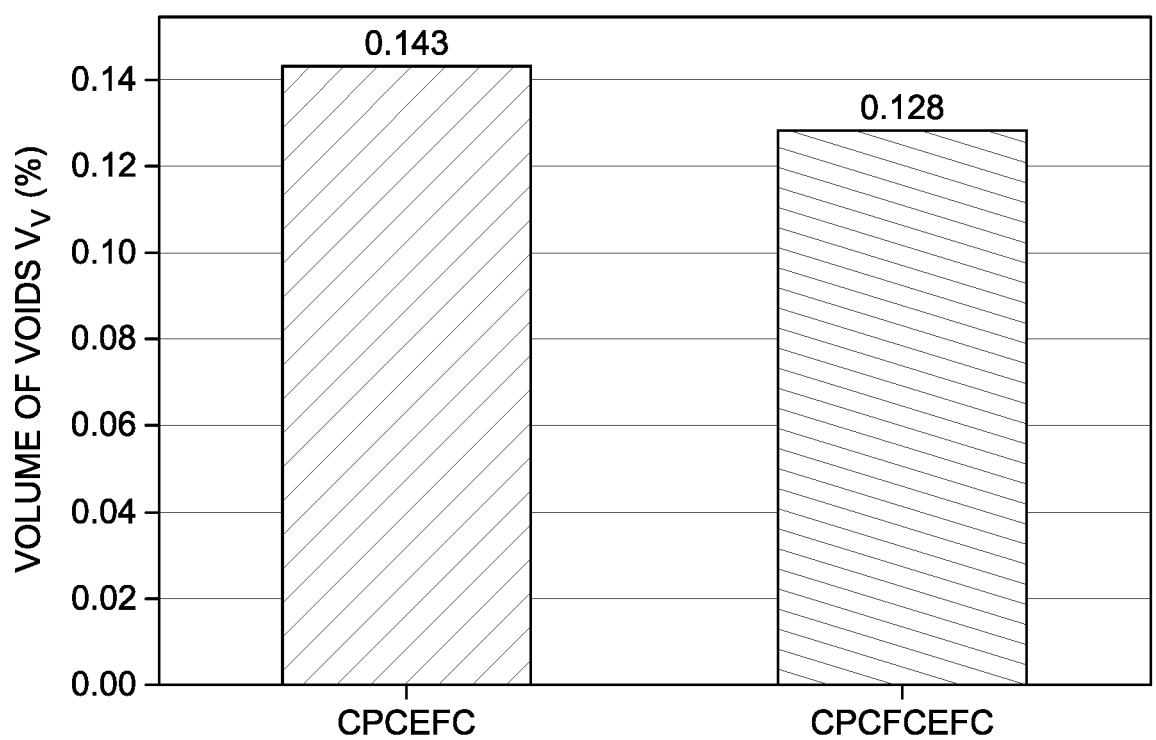
FIG. 2 is a graphical representation showing the volume of voids in a Ceiba Pentandra fiber reinforced carbon fabric composite (CPCEFC) and a Ceiba Pentandra fiber and chicken feather fiber reinforced carbon fabric composite (CPCFCEFC), according to certain embodiments of the present disclosure.

FIG. 2 shows the volume of voids in the CPCEFC and the CPCFCEFC. The presence of void content in the composites leads to a reduction of the mechanical and physical properties of the composites. Both the CPCEFC and the CPCFCEFC show less than 2% voids, and the CPCEFC and CPCFCEFC have good mechanical and physical properties. Thus, the casting technique and the compression molding technique are very effective ways of preparing the composites with less vacuum fraction.

Figure 3A:
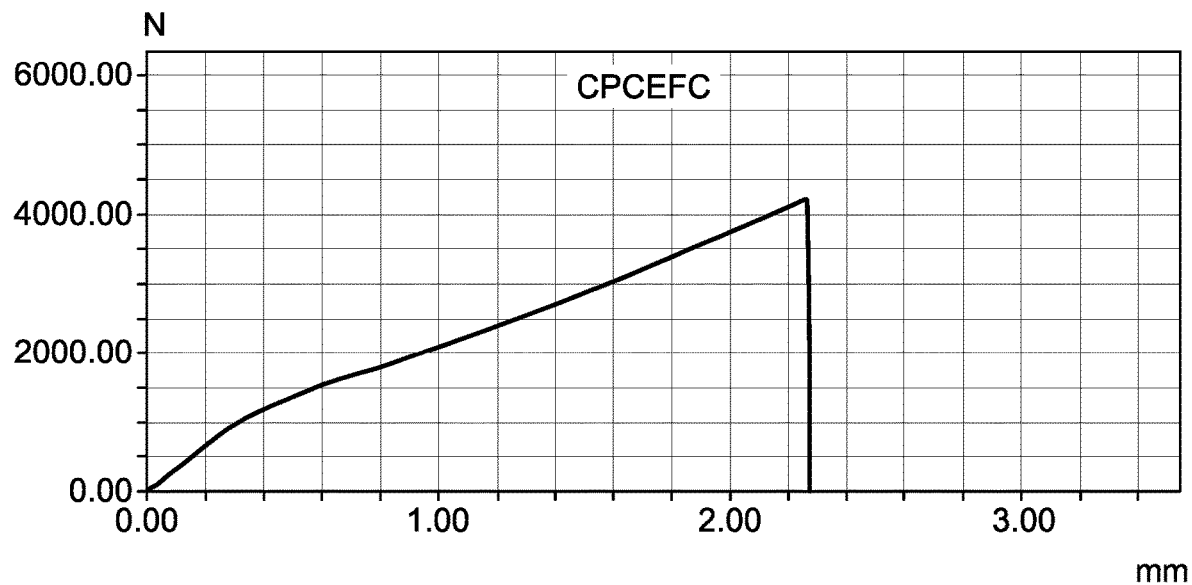
FIG. 3A and FIG. 3B are graphical representations showing tensile load versus displacement of the CPCEFC and CPCFCEFC respectively, according to certain embodiments of the present disclosure.
Figure 3B:
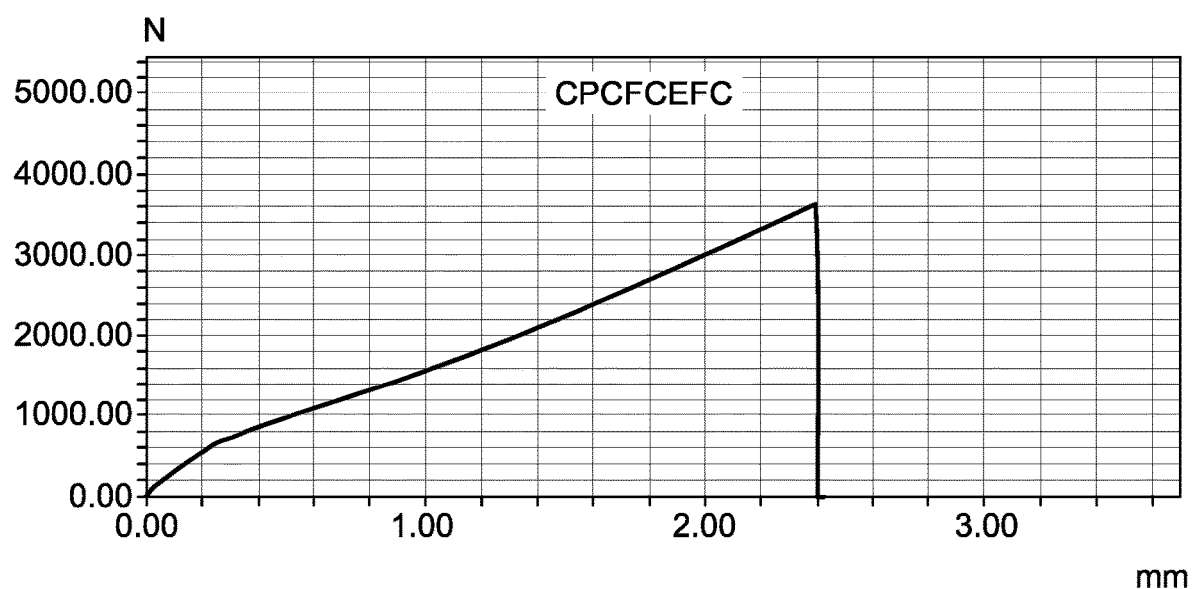
Figure 4:
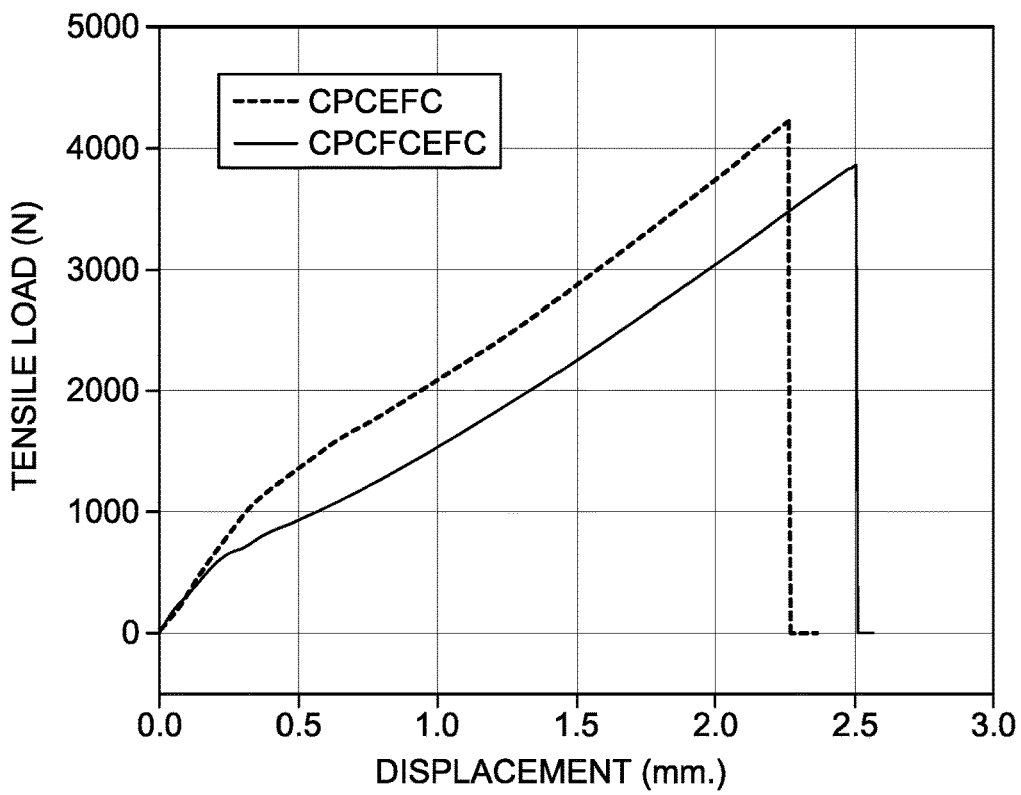
FIG. 4 is a graphical representation showing comparative plots of the tensile load-displacement of the CPCEFC and the CPCFCEFC, according to certain embodiments of the present disclosure.

FIG. 3A shows tensile load versus displacement of the CPCEFC generated directly from the UTM. FIG. 3A shows that the displacement of the CPCEFC is directly proportional to the tensile load applied to the CPCEFC. Similarly, FIG. 3B shows the tensile load versus the displacement of the CPCFCEFC generated directly from the UTM. FIG. 3B shows that the displacement of the CPCFCEFC is directly proportional to the tensile load applied to the CPCFCEFC. FIG. 4 shows a comparative plot of tensile load-displacement of the CPCEFC and the CPCFCEFC. The CPCFCEFC resists the ultimate tensile load of about 4300 N. Thus, the elongation at break is much greater for the CPCEFC and it resists the ultimate tensile load of about 3900 N. Thus, the addition of CFF shows a positive effect on the elongation at break of the composites.

Figure 5:
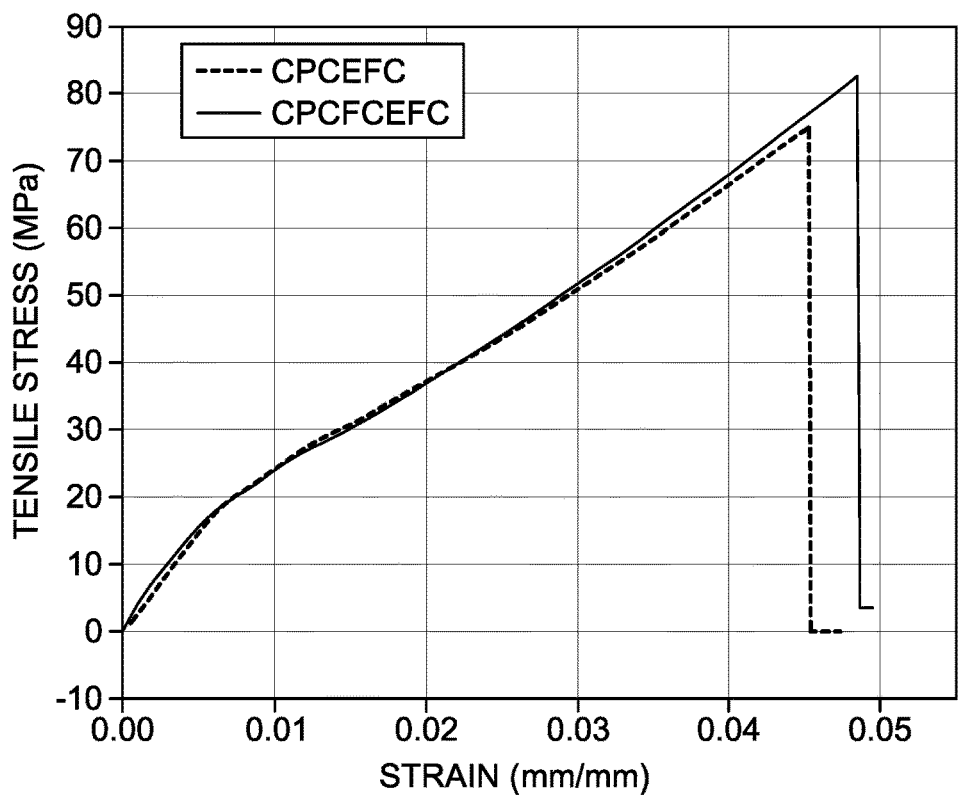
FIG. 5 is a graphical representation showing comparative stress-strain of the CPCFCEFC and the CPCEFC, according to certain embodiments of the present disclosure.
Figure 6:
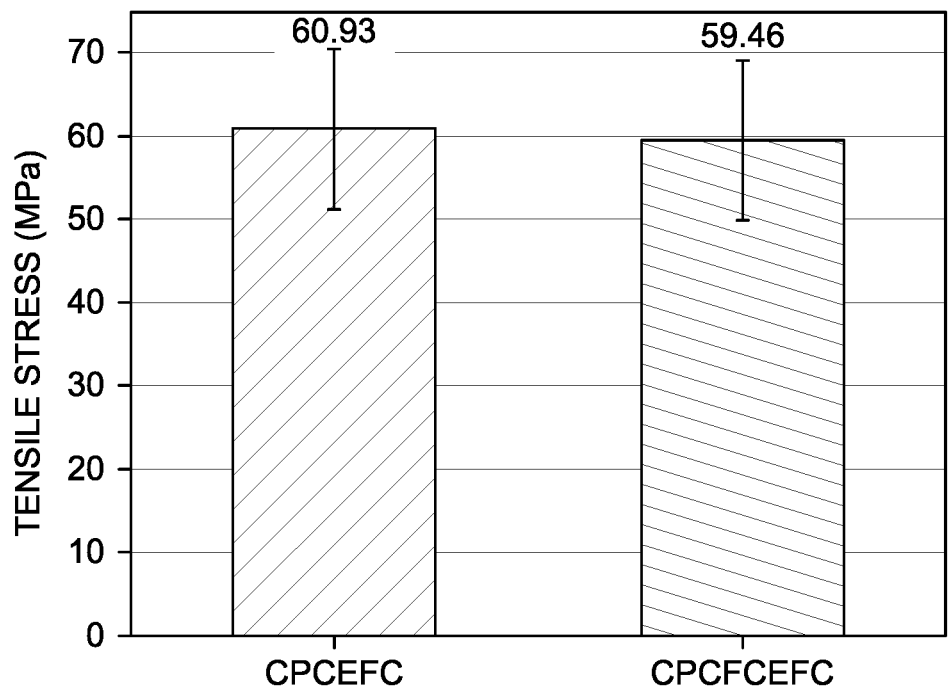
FIG. 6 is a graphical representation showing tensile strength of the CPCEFC and the CPCFCEFC, according to certain embodiments of the present disclosure.
Figure 7:
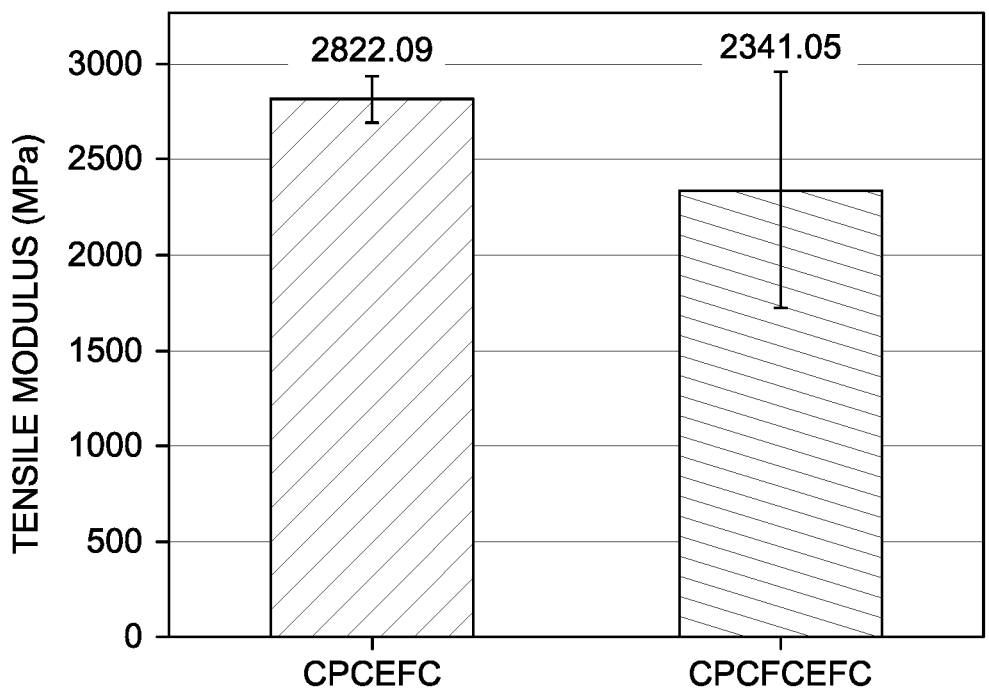
FIG. 7 is a graphical representation showing tensile modulus of the CPCEFC and the CPCFCEFC, according to certain embodiments of the present disclosure.

FIG. 5 shows a comparative stress-strain graph of the CPCFCEFC and the CPCEFC. The graph shows that the CPCFCEFC yield more stress compared to the CPCEFC. FIG. 6 and FIG. 7 show the values of tensile strength and tensile modulus for the CPCEFC and the CPCFCEFC respectively. The tensile strength and the tensile modulus of the CPCEFC containing only CPFs filler were recorded as about 60.93 MPa and about 2822.09 MPa respectively, and the tensile strength and the tensile modulus of the CPCFCEFC was recorded as about 59.46 MPa and about 2341.05MPa, respectively. The tensile results of the CPCFCEFC are lower than that of the CPCEFC. Evidently, there is not much difference in tensile results due to the incorporation of CFF in composite materials. Further, the results were favorable when substituting the CFF in the CPF/bio epoxy matrix system, and are acceptable for applications that do not require a high load capacity. The evidence shows, the incorporation of CFF into the composite is quite effective for reinforcement. Furthermore, the evidence also exhibits that the tensile results of the composites are influenced by the addition of carbon fabrics as skin layers.

Figure 8A:
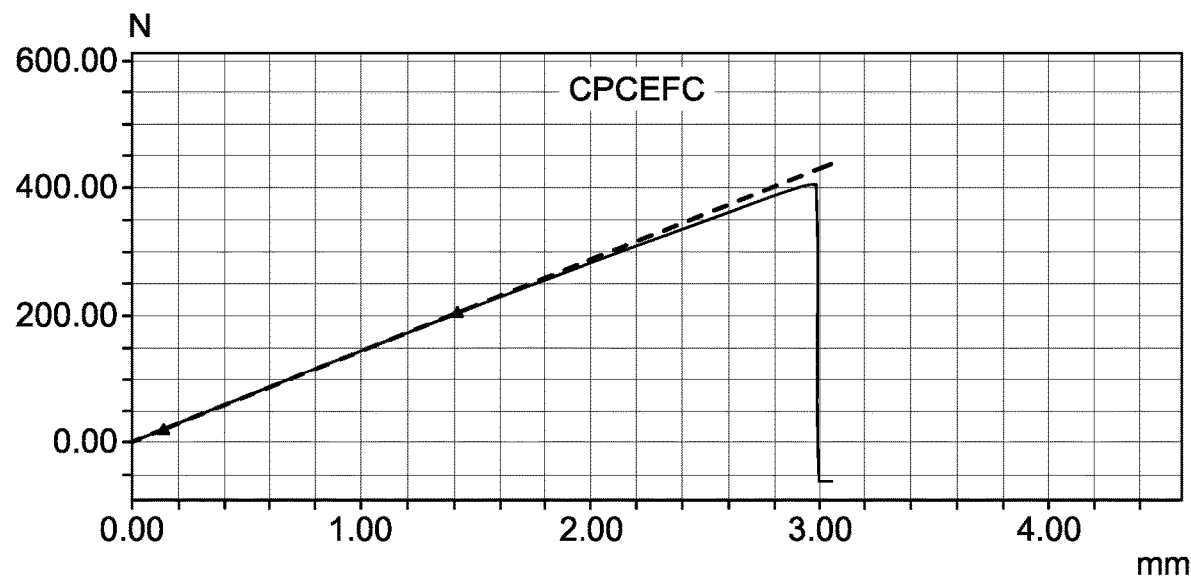
FIG. 8A and FIG. 8B are graphical representations showing flexural load-displacement of the CPCEFC and the CPCFCEFC respectively, according to certain embodiments of the present disclosure.
Figure 8B:
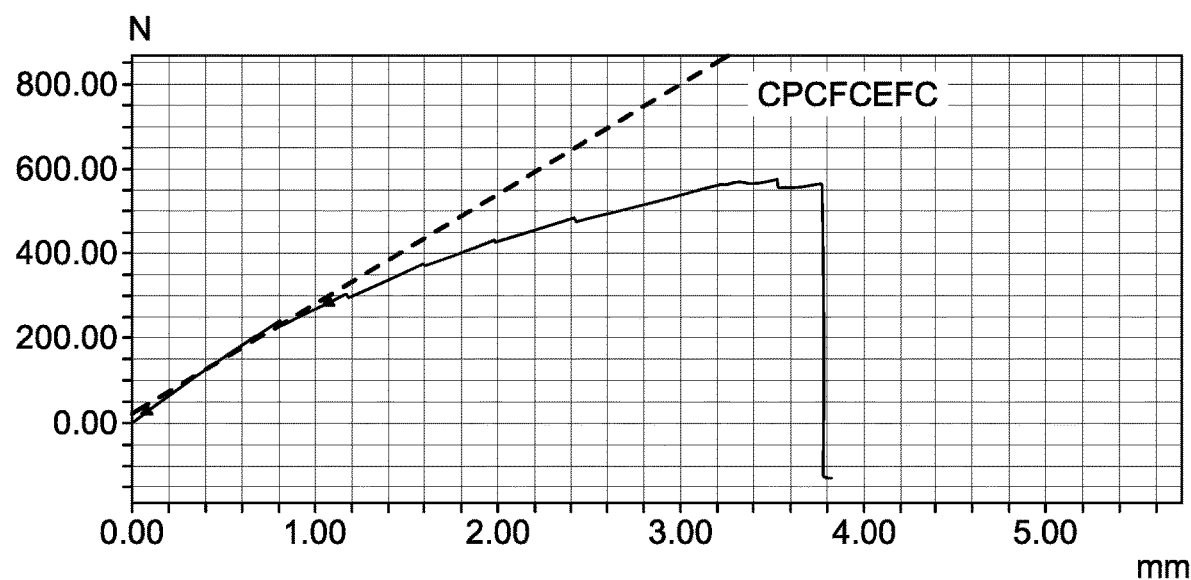
Figure 9:
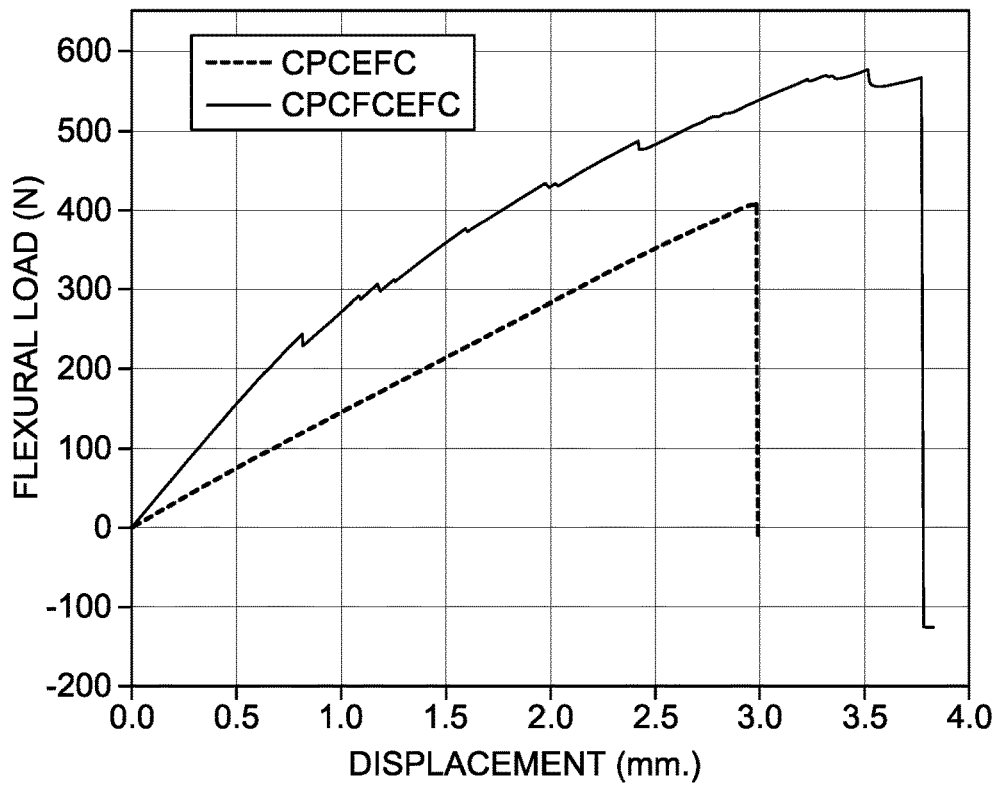
FIG. 9 is a graphical representation showing a comparative plot of flexural load-displacement for the CPCEFC and CPCFCEFC, according to certain embodiments of the present disclosure.

FIG. 8A and FIG. 8B shows a flexural load-displacement graph of the CPCEFC and the CPCFCEFC generated directly from the UTM. The CPCEFC graph indicates non-linear behavior due to failure initiation of crack on the tension side. FIG. 9 shows a comparative plot of flexural load-displacement for the CPCEFC and CPCFCEFC. The CPCFCEFC resists the flexural load of about 550 N and a comparatively less load of about 400 N has been observed for the CPCECF. Further, the displacement of CPCFCEFC is more compared to that of CPCECF.

Figure 10:
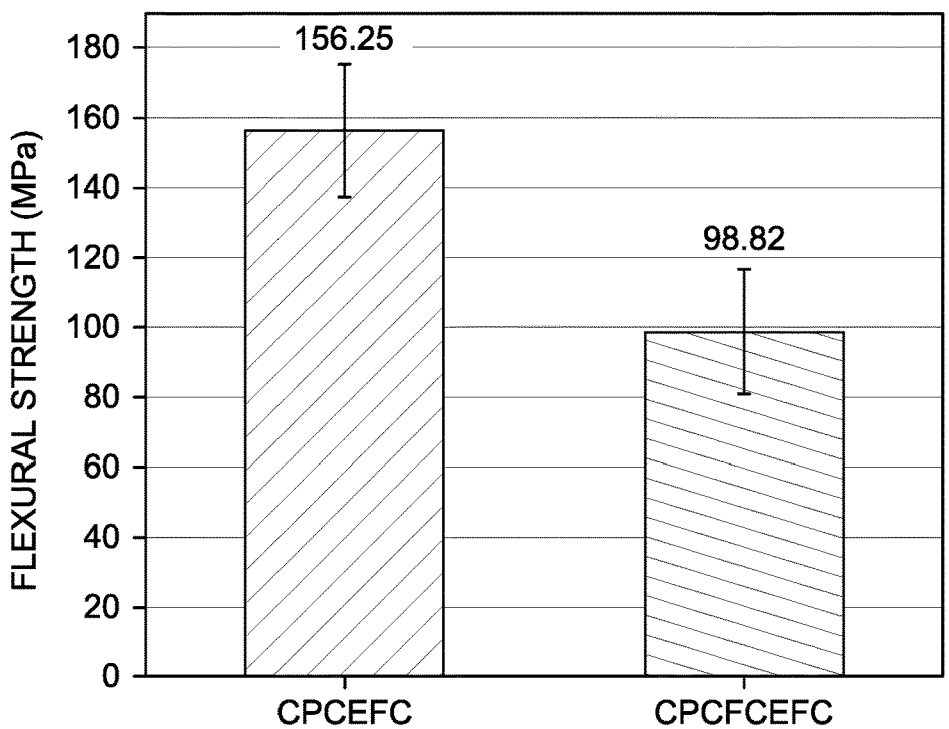
FIG. 10 is a graphical representation showing flexural strength of the CPCEFC and CPCFCEFC, according to certain embodiments of the present disclosure.
Figure 11:
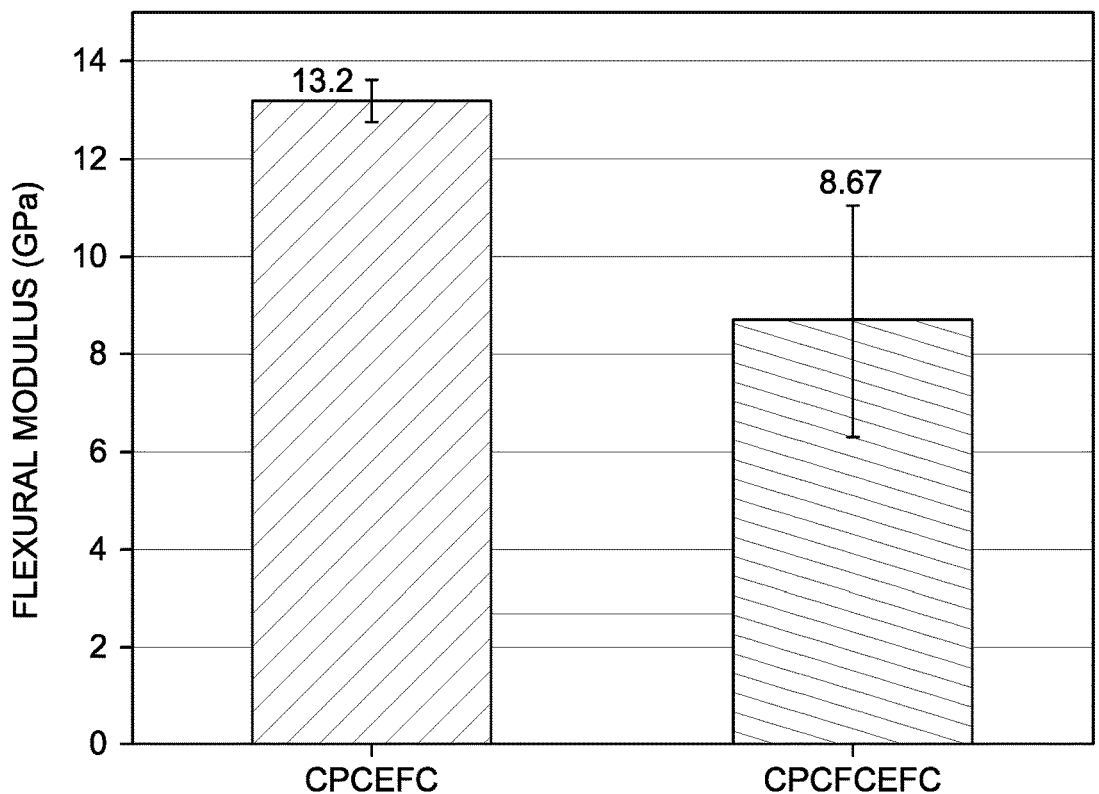
FIG. 11 is a graphical representation showing flexural modulus values of the CPCEFC and CPCFCEFC, according to certain embodiments of the present disclosure.

FIG. 10 and FIG. 11 show flexural strength and flexural modulus values respectively of the CPCEFC and the CPCFCEFC. The flexural strength and modulus of the CPCEFC are about 156.24 MPa and about 13.2 GPa, respectively. The CPCEFC has higher values of flexural strength and modulus compared to CPCFCEFC due to strong adhesion between the CPF and carbon fabrics with a matrix system. The flexural strength and modulus of the CPCFCEFC are about 98.82 MPa and 8.67 GPa, respectively. The addition of CFFs in composite does not show any reinforcing effect for flexural strength, but the composite with CFF can resist more flexural load. Hence, the carbon fabrics play a very important role in the determination of flexural properties. Most of the load was absorbed by the carbon fabrics and after its failure, the remaining load was transferred to the core.

Figure 12:
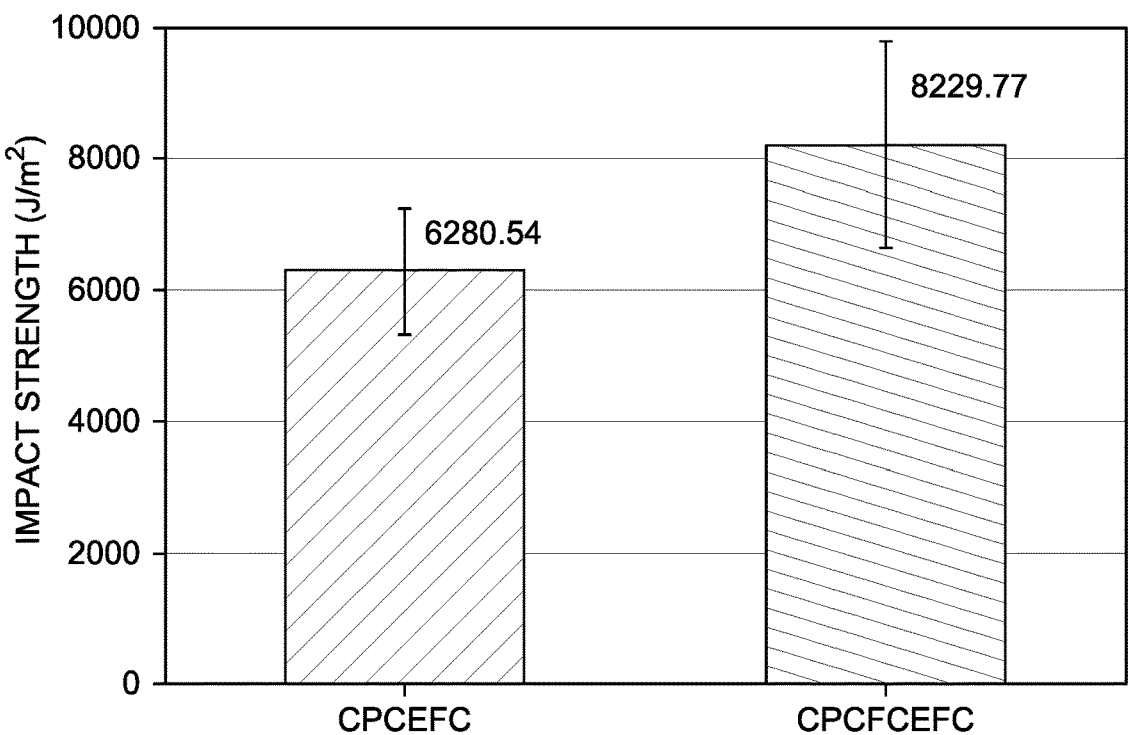
FIG. 12 is a graphical representation showing impact strength of the CPCEFC and the CPCFCEFC, according to certain embodiments of the present disclosure.
Figure 13:
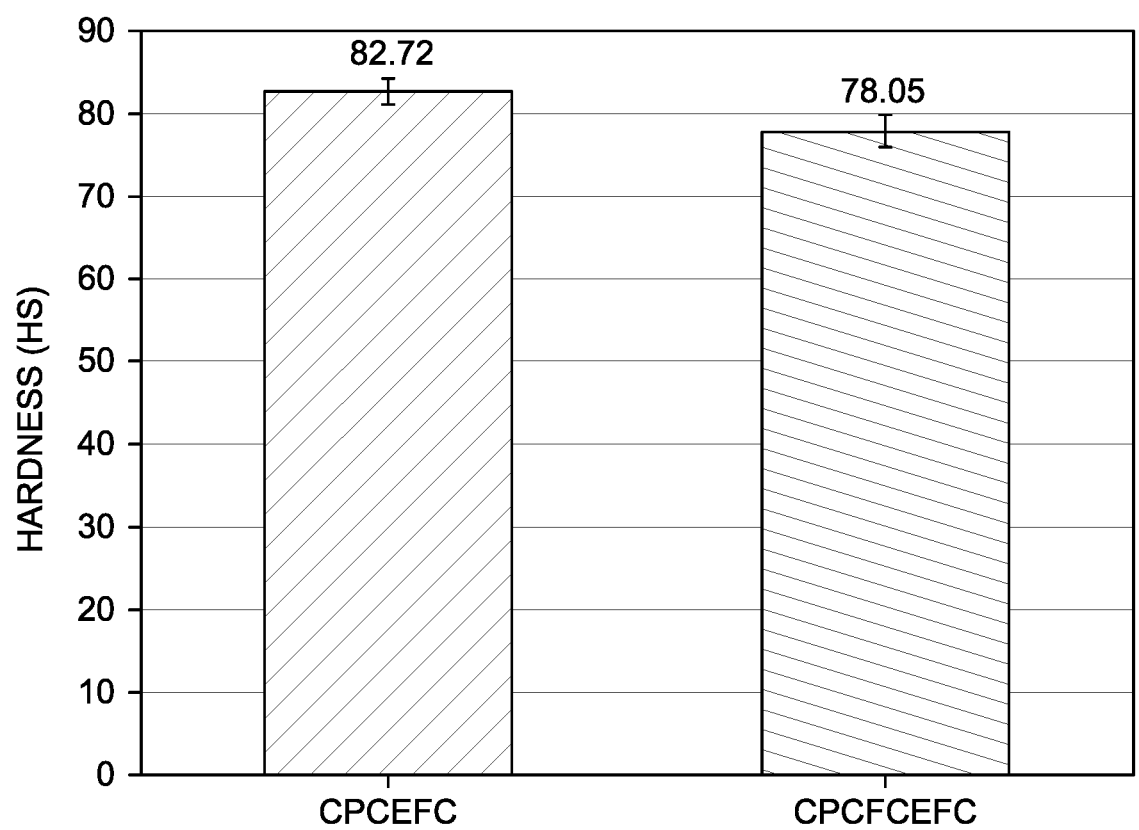
FIG. 13 is a graphical representation showing micro-hardness values of the CPCEFC and the CPCFCEFC, according to certain embodiments of the present disclosure.

FIG. 12 shows impact strength of the CPCEFC and the CPCFCEFC. The maximum impact strength of about 8229.77 J/m$^2$ was achieved by the CPCFCEFC and the impact strength of the CPCEFC was about 6280.54 J/m$^2$. Hence, the addition of CFF is a suitable choice to improve impact strength because of the flexible nature of CFF. Further, the addition of CFF in the bio epoxy matrix system tends to absorb the external impact energy. FIG. 13 shows micro-hardness values of the CPCEFC and the CPCFCEFC. The hardness value of the CPCEFC is quite superior to that of the CPCFCEFC. The CPCEFC exhibits a higher hardness value of about 82.72 HS and the CPCFCEFC exhibits quite a lower hardness value of about 78.05 HS. However, the addition of CFF had a minimal effect on the hardness of the composite while having a high-strength carbon fabric improves the hardness of the composites.

Figure 14A:
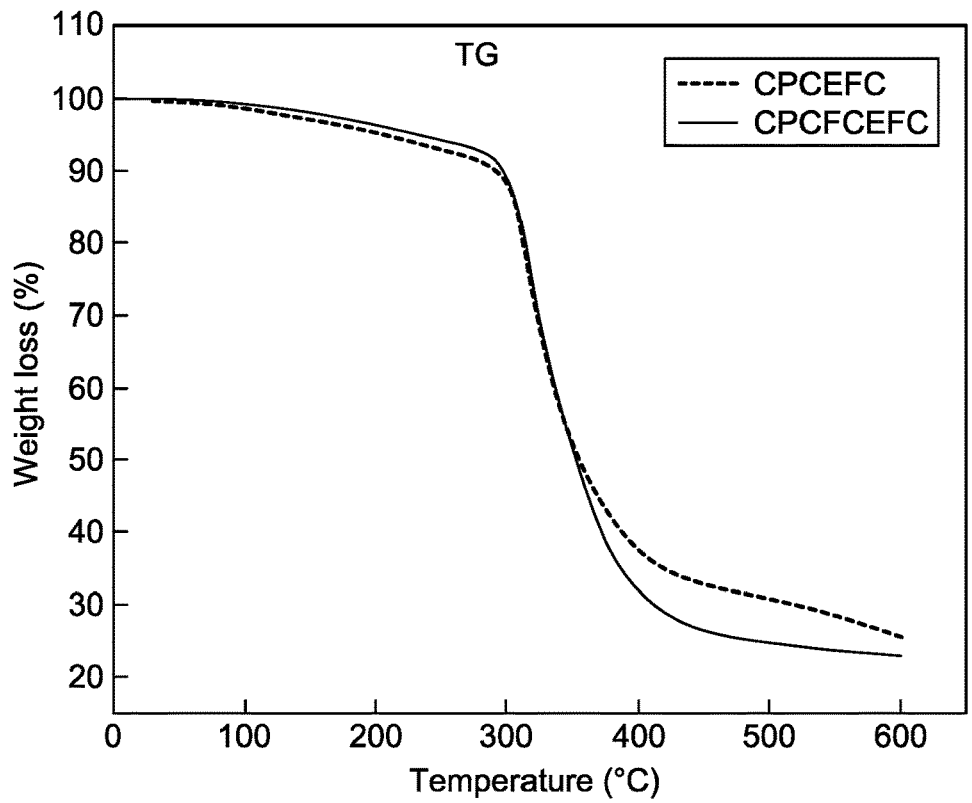
FIG. 14A is a graphical representation showing thermo-gravimetric (TG) curve of the CPCEFC and the CPCFCEFC, according to certain embodiments of the present disclosure.
Figure 14B:
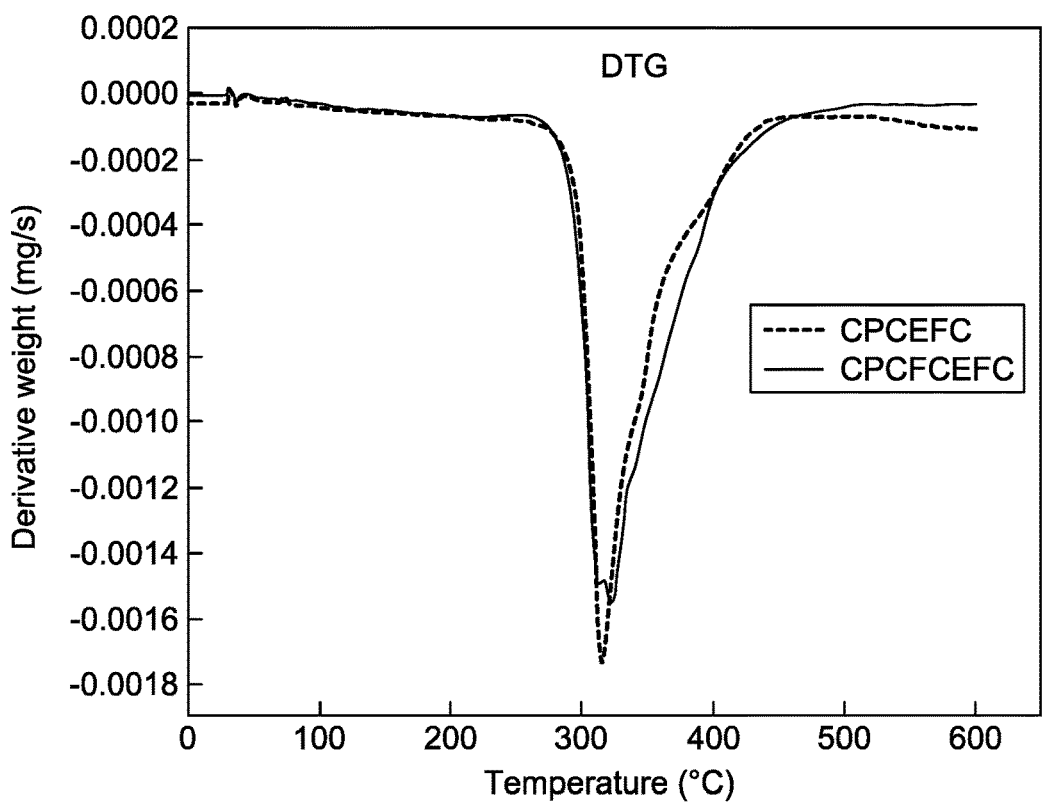
FIG. 14B is a graphical representation showing a derivative thermo-gravimetric (DTG) curve of the CPCEFC and the CPCFCEFC, according to certain embodiments of the present disclosure.

It is useful to evaluate the thermal stability of composites at different temperatures to decide the temperature range for composites applications. FIG. 14A shows a thermo-gravimetric (TG) curve of the CPCEFC and the CPCFCEFC and FIG. 14B shows a derivative of thermo-gravimetric (DTG) curve of the CPCEFC and the CPCFCEFC. The degradation of various components of the CPCEFC and the CPCFCEFC takes place in three phases. In the thermo-gravimetric, a first phase of degradation occurred at a temperature of about 215.5-298.5° C. for the CPCEFC and at a temperature of about 220.5-303.5° C. for the CPCFCEFC, which is mainly due to material degradation. The mass loss occurred in a second phase at a temperature of about 298.5-310.5° C. for the CPCEFC and at a temperature of about 303.5-315.5° C. for the CPCFCEFC, as the materials start to decompose. The complete decomposition of the materials occurred at a temperature of about 315.5° C.-510.5° C. for the CPCEFC and at a temperature of about 315.5° C-520.5° C. for the CPCFCEFC.

The results of the thermal analysis indicate that the CPCFCEFC has a much better thermal stability because the CFF reinforcements act as a thermal barrier in the composite materials. The TGA results confirmed that the CFFs and CPFs are suitable compositions for reinforcement in composite applications with working temperatures up to 310° C.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of preparing a composite laminate, the method comprising:
dequilling chicken feathers to form chicken feather fibers (CFFs),
milling the CFFs and Ceiba Pentandra bark fibers (CPFs) to form milled CFFs and milled CPFs so that the milled CFFs have a length of smaller than 200 microns and the milled CPFs have a length of smaller than 600 microns;
treating the CFFs with tris(hydroxymethyl)aminomethane to esterify carboxy groups present on keratin in the CFFs to form compatibilized CFFs;
treating the CPFs with NaIO$_4$ to form treated CPFs having dialdehyde groups;
covalently bonding the compatibilized CFFs and the treated CPFs through amine groups on the CFFs and dialdehyde groups on the CPFs; then
solution casting a mixture of an epoxy resin, the milled CFFs and the milled CPFs to form an epoxy composite;
placing a first carbon fabric layer on a front side of the epoxy composite and a second carbon fabric layer on a backside of the epoxy composite to form an epoxy laminate precursor; and
compression molding the epoxy laminate precursor in a mold to cure the epoxy laminate precursor and form the composite laminate,
wherein the epoxy resin has a weight fraction of 50%-75% in the composite laminate;
the CFFs have a weight fraction of 10%-30% in the composite laminate;
the CPFs have a weight fraction of 10%-30% in the composite laminate; and
the first carbon fabric layer and the second carbon fabric layer have a weight fraction of 5%-15% in the composite laminate.

2. The method of claim 1, further comprising:
casting the epoxy mixture onto a casting mold; and
drying to form the epoxy composite.

3. The method of claim 2, wherein:
the epoxy composite has a thickness of 2-4 millimeters, and
the composite laminate has a thickness of 2-4 millimeters.

4. The method of claim 1, further comprising extracting the CFFs from chicken feathers by:
washing chicken feathers with an organic solvent that is soluble in water; and
milling CFFs having a length of 10-30 mm to form the milled CFFs.

5. The method of claim 4, wherein the milled CFFs have a density of 0.35-0.40 gram per cubic centimeter.

6. The method of claim 1, further comprising extracting the CPFs from Ceiba Pentandra bark by:
immersing the Ceiba Pentandra bark in water;
comminuting the Ceiba Pentandra bark to form comminuted CPFs; treating the comminuted CPFs with an aqueous solution of sodium hydroxide to form the CPFs; and
milling the CPFs to form the milled CPFs.

7. The method of claim 6, wherein the milled CPFs have a density of 0.55-0.60 gram per cubic centimeter.

8. The method of claim 1, further comprising curing the composite laminate at an elevated temperature.

9. The method of claim 8, further comprising curing the composite laminate at 80° C. for 24 hours to form a cured composite laminate before cutting the cured composite laminate into required specimen dimensions.

10. The method of claim 1, further comprising mixing the epoxy resin with a hardener wherein:
   the hardener includes a mixture of isophorone diamine and benzyl alcohol; and
   the epoxy resin and the hardener are mixed in a weight ratio of 1:0.5 to 1:0.2.

11. The method of claim 10, wherein:
   the isophorone diamine has a weight percentage of less than 60% in the hardener; and
   the benzyl alcohol has a weight percentage of less than 40% in the hardener.

12. The method of claim 1, wherein more than 50% of chemical composition of the epoxy resin is from plants.

13. The method of claim 1, wherein the first carbon fabric layer and the second carbon fabric layer includes carbon fabrics in a plain woven form of 300-400 grams per square meter.

* * * * *